Jan. 23, 1968   HARUO NISHIMURA   3,365,363
METHOD OF CONTROLLING RICE BLAST
Filed Nov. 21, 1963   2 Sheets-Sheet 1
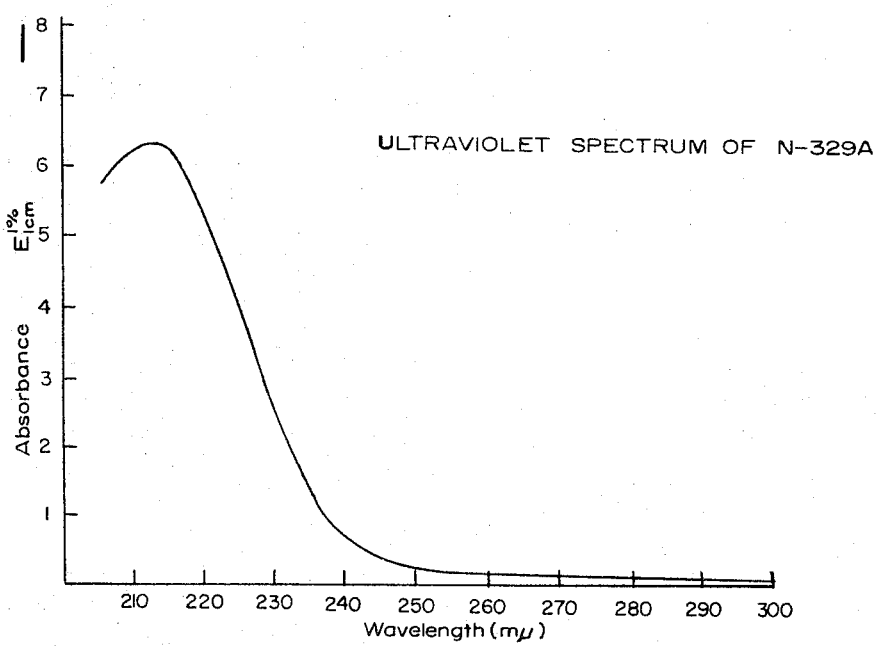
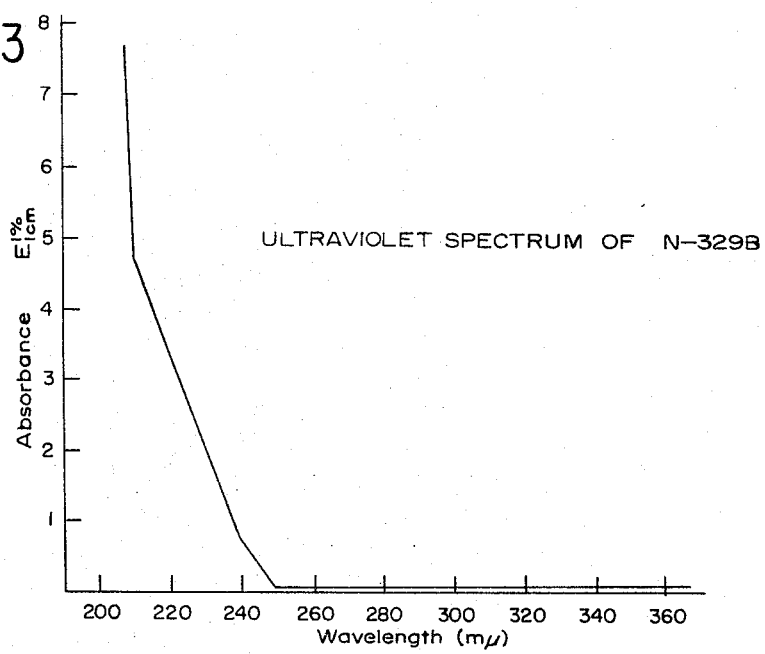
Haruo Nishimura
INVENTOR
BY Wenderoth, Lind and Ponack,
ATTORNEYS

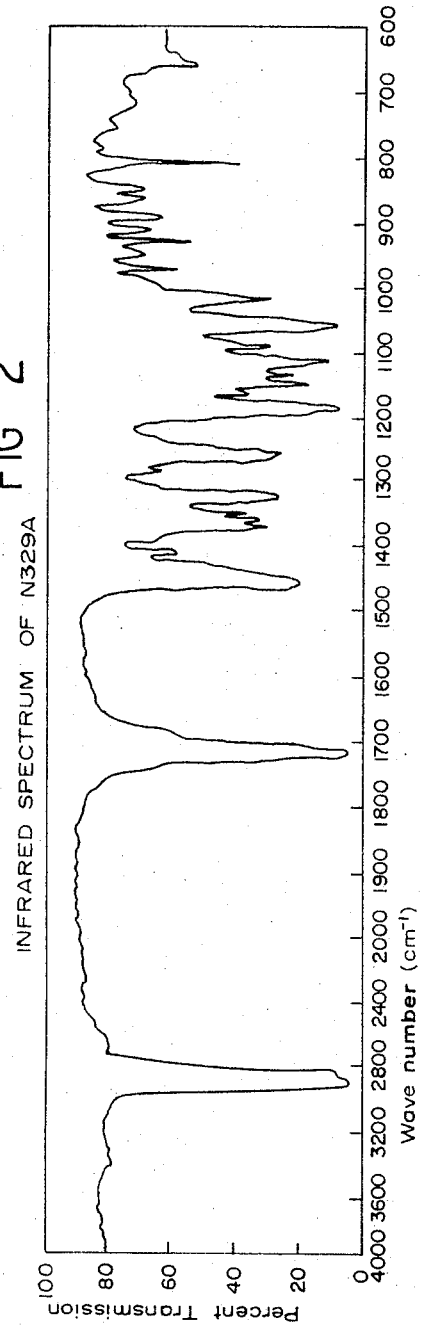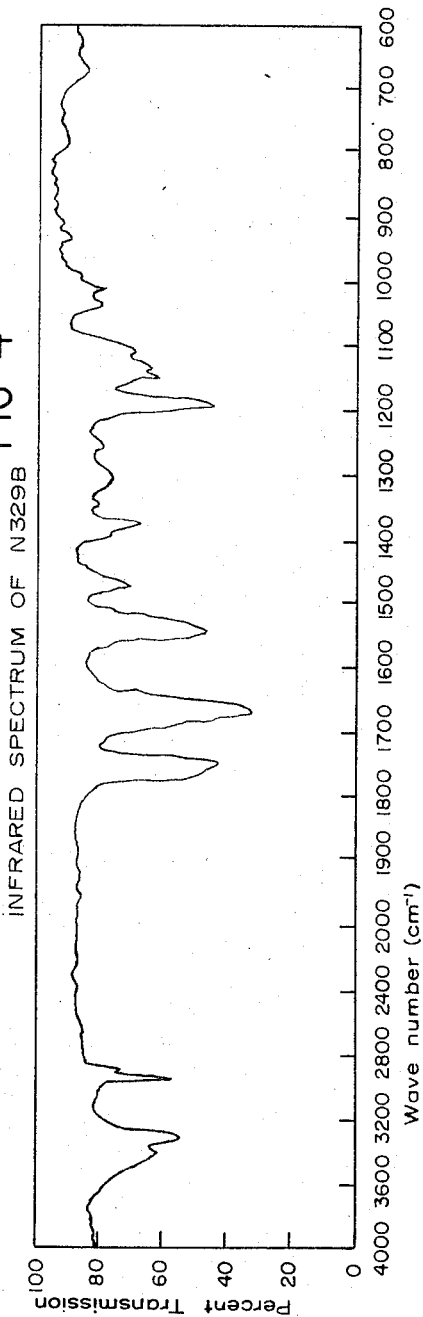

United States Patent Office 3,365,363
Patented Jan. 23, 1968

3,365,363
METHOD OF CONTROLLING RICE BLAST
Haruo Nishimura, Ashiya-shi, Japan, assignor to
Shionogi & Co., Ltd., Osaka, Japan
Filed Nov. 21, 1963, Ser. No. 325,431
Claims priority, application Japan, Aug. 3, 1963,
38/41,578
7 Claims. (Cl. 167—30)

ABSTRACT OF THE DISCLOSURE

Method of controlling rice blast on a rice plant which comprises applying to the rice plant a fungicidal quantity of at least one of the antibiotics produced by cultivating *Streptomyces tsusimaensis* ATCC No. 15141 in a nutrient medium and recovering the accumulated antibiotic(s) from the fermentation broth.

---

This invention relates to agricultural germicides, and to methods for their production. More particularly, it relates to germicidal compositions for agricultural use containing an antibiotic designated "N–329A" and/or an antibiotic designated "N–329B," and to methods for production of the said antibiotics.

According to the present invention, Streptomyces species N–329, indexed in the collection of Shionogi & Co., Ltd., Osaka, Japan, and on deposit with the American Type Culture Collection under the accession number ATCC No. 15141 can produce two antibiotics designated N–329A and N–329B, respectively.

The aforesaid standard strain of Streptomyces N–329 has been isolated in conventional manner from a soil sample collected at Tsushima Island, Nagasaki Pref., Japan, and shows the following microbiological characteristics.

*Morphological characteristics.*—The morphological property of the strain was observed on synthetic and organic media according to the agar-cylinder culture method [Nishimura et al.: J. Antibiotics (A), vol. 10, p. 227 (1957)] after 14 days' incubation at 28° C. and detailed observations were made by the aid of electron microscope. The sporophores are straight to flexuous and branch in tuft. The spores are formed in chain. The shape of spores is ellipsoidal to cylindrical and the surface smooth.

*Cultural characteristics.*—The observation was made through a 14 days' incubation period at 28° C. The results are shown in the following table:

*Physiological characteristics.*—The observation was made after incubation at 28° C. for 14 days, unless otherwise indicated. The results are shown in the following table:

Test:                                           Result
- Acid formation from glucose-peptone (10 days incubation at 28° C.) _____ Negative
- Melanoid pigment _____ Positive
- Tyrosinase reaction _____ Positive
- Starch hydrolysis _____ Positive
- Nitrate reduction _____ Positive
- Gelatin liquefaction _____ Positive (strong)
- Milk peptonization _____ Positive
- Cellulase reaction _____ Negative The utilization of carbon sources on the basal medium of Pridham and Gottlieb by the organism after 14 days' incubation at 28° C. is shown in the following table wherein the marks "+" and "++" indicate increasing utilization, the mark "−" no utilization and the mark "±" doubtful utilization:

Carbon source:                               Result
- d-Glucose _____ ++ (good growth)
- d-Mannose _____ ++ (do)
- d-Fructose _____ ++ (do)
- Mannitol _____ ++ (do)
- Galactose _____ ++ (do)
- Maltose _____ ++ (do)
- l-Arabinose _____ + (fair growth)
- Sucrose _____ + (do)
- d-Xylose _____ + (do)
- Lactose _____ + (do)
- Salicine _____ + (do)
- Inositol _____ ± (faint growth)
- Rhamnose _____ ± (do)
- Rhaffinose _____ ± (do)
- Sorbitol _____ − (no growth)
- Insulin _____ − (do)
- Ducitol _____ − (do)

From the results of these observations, the characteristics of Streptomyces N–329 are summarized as follows: Sporophores are straight to flexuous in tuft, surface of spores smooth and spores ellipsoidal to cylindrical. Growth type on glucose broth is pellicle type. Acid production from glucose is negative. Colour of aerial mycelium is yellowish white to yellowish gray and substratum mycelium pale yellowish brown on synthetic media. Colour

| Medium | Growth | Sporulation | Colour | | |
|---|---|---|---|---|---|
| | | | Aerial mycelium | Substratum mycelium | Soluble pigment |
| Synthetic agar (glycerol Czapek's agar). | Good | Good, powdery | Yellowish white to yellowish gray. | Pale yellowish brown to grayish yellow brown. | Pale yellowish brown. |
| Glucose-asparagine agar | Moderate | Good | Yellowish gray | Yellowish gray | None. |
| Calcium malate agar | do | Moderate | do | Yellowish gray to light yellowish brown. | Do. |
| Starch agar | Good | Good, powdery | do | Grayish brown | None to pale brown. |
| Glucose-Czapek's solution | Moderate (pellicle). | Moderate | do | Yellowish gray | Pale yellow. |
| Nutrient agar | Good | Good, powdery | Yellowish white | Pale yellowish brown | Pale yellowish brown. |
| Glucose-bouillon agar | do | do | Yellowish gray | Yellowish brown | Yellowish brown (chromogenic). |
| Glucose-peptone agar | do | Moderate, powdery. | Yellowish white | do | Do. |
| Glucose-broth | Good (pellicle). | Good | Yellowish gray | Pale yellow to pale yellowish brown. | Yellowish brown. |
| Cellulose agar | Scant | | | | |
| Potato | Good, thick wrinkled. | Good | Yellowish gray | Pale yellowish brown | Yellowish brown to brownish black. |

Growth response to temperature: Good growth at 28° C., fair growth at 37° C., no growth at 45° C.
Growth type on glucose broth: Pellicle type.

of aerial mycelium is yellowish white to yellowish gray, substratum mycelium pale yellowish brown to yellowish brown and soluble pigment yellowish brown (chromogenic) on organic media. Melanoid pigment and tyrosinase reaction are positive. Reduction of nitrate is positive.

Among many species of Streptomyces described in Bergey's "Manual of Determinative Bacteriology," Waksman and Lechevalier's "Actinomycetes and their Antibiotics," Waksman's "The Actinomycetes" and other literatures, Streptomyces N–329 appears to be most closely related to *Streptomyces griseus* by morphological properties, colour of aerial mycelium on synthetic agar, some biochemical characteristics and growth type on glucose broth. However, it differs from *Streptomyces griseus* in diffusible pigment on a number of media and melanoid pigment as shown in the following table:

preferable to add anti-foaming agents such as vegetable oils, lard oil and polypropyleneglycol to the fermentation medium prior to or in the course of the fermentation.

Upon execution of the fermentation under said conditions, active components containing two kinds of antibiotics designated N–329A and N–329B are accumulated in the medium. The relative yields of these antibiotics are changed depending on the fermentation conditions, especially fermentation time. Generally speaking, a shorter time results in a higher yield of the antibiotic N–329A and a longer time causes a higher yield of the antibiotic N–329B. For instance, in the fermentation at a temperature from 27 to 29° C., the maximum yields of N–329A and N–329B are obtained within 48 to 192 hours and

| Properties | Streptomyces N-329 | Streptomyces griseus | | |
|---|---|---|---|---|
| | | B₁ | W-118 | H-12 |
| Glycerol-Czapek's agar, soluble pigment | Pale yellowish brown. | None | None | None. |
| Glucose-Czapek's solution, soluble pigment | do | do | do | Do. |
| Nutrient agar, soluble pigment | Pale yellowish | do | do | Do. |
| Peptone glucose agar, soluble pigment | Yellowish brown | do | do | Do. |
| Glucose-bouillon agar, soluble pigment | do | do | do | Do. |
| Melanoid pigment | Positive | Negative | Negative | Negative. |
| Gelatin medium | Dark brown | Pale yellowish brown. | Pale yellowish brown. | None. |

Thus, the microorganism has been designated a new species and named *Streptomyces tsusimaensis* n. sp.

It is to be understood that for the production of the antibiotics N–329A and/or N–329B the present invention is not limited to the use of the said *Streptomyces tsusimaensis* n. sp. It is especially desired and intended to include the use of the mutants or variants produced in conventional manner from the described organism by various means such as X-rays, ultraviolet radiation and nitrogen mustards.

In accordance with one aspect of the present invention, the antibiotics N–329A and/or N–329B are produced during cultivation of the said microorganism, *Streptomyces tsusimaensis* n. sp., in an aqueous nutrient medium at a temperature of about 25 to about 32° C., preferably 27 to 29° C., under aerobic conditions. The composition of the nutrient medium may be varied over a very wide range. Essentially what is required is a carbon source, a nitrogen source and trade inorganic elements. Examples of suitable carbon sources are starch, glucose, glycerol, dextrin, maltose, fructose, sucrose, lactose and molasses. Suitable sources of nitrogen for the fermentation process include meat extracts, peptone, corn steep liquor, soybean meal, peanut meal, wheat gluten, cotton seed flour, casamino acid (acid hydrolyzate of casein) NZ amine (enzymatic hydrolyzate of casein) and yeast extracts. Examples of suitable sources of inorganic elements are mineral salts such as sodium chloride, potassium chloride, calcium carbonate and potassium phosphate. The nutrient medium may or may not be adjusted to about pH 7.0 prior to inoculation of the microorganism. The pH tends to remain rather constant during the fermentation but, if variations are encountered, a buffering agent may be added to the medium for maintaining the pH around 7.0. The use of anti-foaming agents are unnecessary in ordinary cases. However, when the fermentation is carried out in a relatively large scale, it may be 144 to 312 hours, respectively. Further, better aeration tends to increase the yield of the antibiotic N–329B. In general, the fermentation may be performed for a wide range of time, i.e. about 30 to about 340 hours, under optimum conditions of temperature and aeration.

After growth of the microorganism, the mycellium is separated from the fermentation broth by using standard equipment such as filter presses and centrifuges. In this separation operation, there may be used a conventional filter aid such as diatomaceous earth (Hyflo Super-Cell), asbestos, activated carbon and talc. If desired, the pH of the fermentation broth may be adjusted around 7.0 prior to separation. The thus separated cake of the mycelium, if used, with the filter aid is treated according to a solvent extraction procedure for recovery of the antibiotics. For instance, the cake is shaken with a suitable solvent such as acetone, methanol, ethanol, petroleum ether, ether, benzene, chloroform, glacial acetic acid and butyl acetate, followed by evaporation of the solvent from the extract to give a crude active component containing the antibiotics N–329A and N–329B.

For isolation of each of the antibiotics N–329A and N–329B, the thus obtained crude active component is treated in a conventional separation procedure such as extraction, precipitation, adsorption or recrystallization or the combination thereof. For instance, the crude active component is dissolved in petroleum ether and then concentrated whereby crystalline precipitate is separated. The precipitate is collected by filtration and crystallized from a suitable solvent such as acetone and methanol to give the antibiotic N–329A as pure crystals. The filtrate is further concentrated, chromatographed on alumina and eluted with petroleum ether. After evaporation of the solvent from the eluate, the residue is crystallized from a suitable solvent such as acetone and methanol to give the antibiotic N–329B as pure crystals.

One of the thus obtained antibiotics, N–329A, melts at 148 to 149.5° C. The elementary analysis is as follows: C, 65.65; H, 8.85; O, 25.48; no nitrogen, sulfur and halogen. The molecular weight is 730 to 740 by the Rast method. The above analyses correspond to the molecular formula $C_{40}H_{64}O_{12}$ for the antibiotic N–329A. The specific rotation is $[\alpha]_D^{22}+0.5\pm2°$ (c.=1.269% in chloroform). The ultraviolet absorption spectrum in 95% ethanol is characterized by maxima at 211 to 213 m$\mu$ ($E_{1\,cm.}^{1\%}=6.4$)

(shown in the accompanying drawings, FIG. 1). The infrared absorption spectrum in a Nujol mull shows the following characteristic bands: 2921, 1726, 1468, 1425, 1383, 1371, 1360, 1333, 1298, 1265, 1190, 1168, 1152, 1135, 1116, 1095, 1061, 1021, 996, 974, 948, 932, 912, 893, 868, 852, 813, 793, 750, 723, 658 cm$^{-1}$ (shown in the accompanying drawings, FIG. 2). It gives positive Dragendorf's test and iodine reaction. Ninhydrin, biuret, Molisch, indol, anthrone, Tollen's phloroglucin, Sakaguchi and ferric chloride tests are negative, and also an acid hydrolysate gives negative ninhydrin test.

The other antibiotic, N–329B, melts at 190.5 to 191° C. The elementary analysis is as follows: C, 58.48; H, 8.22; O, 24.77; N, 7.66; no sulfur and halogen. The molecular weight is 764 by the Rast method. The above analyses correspond to the molecular formula $$C_{36}H_{60}O_{12}N_4$$

The specific rotation is $[\alpha]_D^{23}+36.2\pm2°$ (c.=1.015% in chloroform) and $[\alpha]_D^{25}+32.3\pm.3°$ (c.=1.539% in benzene). The ultraviolet absorption spectrum in n-hexane presents no maxima (shown in the accompanying drawings, FIG. 3). The infrared absorption spectrum in a potassium bromide tablet shows the following characteristic bands: 3300, 2954, 1743, 1652, 1538, 1470, 1375, 1345, 1313, 1302, 1252, 1191, 1147, 1131, 1098, 1027, 1009, 978, 931, 886, 865, 795, 764, 749 cm$^{-1}$ (shown in the accompanying drawings, FIG. 4). It gives positive Dragendorf's test and iodine reaction, and an acid hydrolysate gives a strongly positive ninhydrin test. Biuret, Molisch, indol, anthrone, Tollen's phloroglucin, Sakaguchi and ferric chloride reactions are negative. The acid hydrolysate of the antibiotic N–329B was confirmed to include valine, $\alpha$-hydroxyisovaleric acid and lactic acid by paper chromatography.

The above physico-chemical properties of the antibiotics N–329A and N–329B are respectively quite similar to those of the heretofore known antibiotics Nonactin [Corbaz et al.: Helv. Chim. Acta, vol. 38, p. 1445 (1955)] (this antibiotic is also designated as SQ 15,859 [Dutcher: Antimicrobial Agents and Chemotherapy, p. 173, (1961)] and TA 25M–I [Okuda et al.: Studies on macrocyclic polylactone antibiotics. Presented at the 130th Meeting of Japan Antibiotic Research Association held in Tokyo, Japan on May 25, 1962]) and Valinomycin [Brockmann et al.: Chem. Ber., vol. 88, p. 57 (1955); Ann., vol. 603, p. 216 (1957). Brown et al.: Antibiotics and Chemotherapy, vol. 12, p. 482 (1962)] as shown in the following table:

| Properties | N–392A | Nonactin (Corbaz et al.) | SQ 15,859 (Dutcher) | TA 25M–I (Okuda et al.) | N–329B | Valinomycin (Brockmann et al.) | Valinomycin (Brown et al.) |
|---|---|---|---|---|---|---|---|
| Melting point | 148–149.5° C | 147–148° C | 148–152° C | 142–143.5° C | 190.5–191° C | 190° C | 186–186.5° C. |
| Elementary analysis, percent: | | | | | | | |
| C | 65.65 | 65.13 | 65.30 | 65.18 | 58.48 | 58.34 | 58.12. |
| H | 8.85 | 8.81 | 8.50 | 9.05 | 8.22 | 8.25 | 7.83. |
| O | 25.48 | 26.20 | 26.20 | | 24.77 | 25.92 | 26.49. |
| N | | | | | 7.66 | 7.48 | 7.56. |
| Molecular weight | 730–740 | 719–727 | 500–700 | 626.85 | 764 | 675, 775, 750 | 734. |
| Molecular formula | $C_{40}H_{64}O_{12}$ | $C_{40}H_{64}O_{12}$ | $C_{40}H_{64}O_{12}$ | $C_{34}H_{55-58}O_{10}$ | $C_{36}H_{60}O_{12}N_4$ | $C_{36}H_{60}O_{12}N_4$ | $C_{36}H_{60}O_{12}N_4$. |
| Specific rotation | $[\alpha]_D^{22}+0.5°$ ($\pm2°$). (c.=1.269% in $CHCl_3$). | $[\alpha]_D$ 0° ($\pm2°$) (c.=1.2% in $CHCl_3$). | | $[\alpha]_D^{28}+0.5°$ (c.=7% in dioxane). | $[\alpha]_D^{28}+32.2°$ ($\pm1.3°$). (c.=1.5% in benzene). | $[\alpha]_D^{20}+31.0°$ (c.=1.6% in benzene). | $[\alpha]_D^{22}+31.3°$. (c.=1.57% in benzene). |
| Ultraviolet absorption | 211–213 m$\mu$ | 264 m$\mu$ | No bands above 215 m$\mu$. | End absorption. | No absorption. | 281 m$\mu$ | No absorption. |
| Composition of acid Hydrolyzate: | | | | | | | |
| Valine | | | | | + | 4 mol | +. |
| $\alpha$-Hydroxyisovaleric acid | | | | | + | 2 mol | +. |
| Lactic acid | | | | | + | 2 mol | +. |

NOTE.—Data is quoted from the references of each author.

In view of the said similarities, actual comparison tests of the antibiotics N–329A and N–329B with authentic samples of the above known antibiotics provided by each author were carried out in melting point, elementary analysis, molecular weight, specific rotation, ultraviolet absorption spectrum and/or infrared absorption spectrum, and it was confirmed that the physico-chemical properties of the antibiotics N–329A and N–329B were substantially identical with those of Nonactin (SQ 15,859, TA 25M–1) and Valinomycin, respectively.

Hitherto, Nonactin has been reported as being remarkably inactive against chemical compounds and microbes. Valinomycin has been reported to be active in vitro against *Mycobacterium tuberculosis* but, because of its relatively high toxicity, it has not been applied to practical use. It has now been unexpectedly found that the antibiotics N–329A and N–329B and also the said known antibiotics which have substantially the same physico-chemical properties as either one of the former show characteristically a high antifungal activity against *Piricularia oryzae* and/or other phytopathogenic fungi.

To determine the minimal inhibitory concentrations of the antibiotics N–329A and N–329B against various microorganisms including bacteria, fungi and yeasts and to make direct comparison with those of Nonactin, SQ 15,859, TA 25M–1 and two samples of Valinomycin, these antibiotics were examined by using their acetone solutions. The results are shown in the following tables:

TABLE A

| Test organisms | Minimal inhibitory concentration (mcg./ml.) | | | |
|---|---|---|---|---|
| | N-329A | Nonactin (Corbaz et al.) | SQ 15,859 (Dutcher) | TA 25M-I (Okuda et al.) |
| 1. Shigella dysenteriae | >100.0 | >100.0 | >100.0 | >100.0 |
| 2. Shigella paradysenteriae, Ohara | >100.0 | >100.0 | >100.0 | >100.0 |
| 3. Salmonella typhosa | >100.0 | >100.0 | >100.0 | >100.0 |
| 4. Salmonella paratyphi A | >100.0 | >100.0 | >100.0 | >100.0 |
| 5. Escherichia coli | >100.0 | >100.0 | >100.0 | >100.0 |
| 6. Pseudomonas aeruginosa | >100.0 | >100.0 | >100.0 | >100.0 |
| 7. Klebsiella pneumonia | >100.0 | >100.0 | >100.0 | >100.0 |
| 8. Bacillus subtilis | >100.0 | >100.0 | >100.0 | >100.0 |
| 9. Bacillus anthracis | >100.0 | >100.0 | >100.0 | >100.0 |
| 10. Staphylococcus aureus, 209 P | >100.0 | >100.0 | >100.0 | >100.0 |
| 11. Diplococcus pneumoniae, type I | >100.0 | >100.0 | >100.0 | >100.0 |
| 12. Diplococcus pneumoniae, V-type I | >100.0 | >100.0 | >100.0 | >100.0 |
| 13. Diplococcus pneumoniae, type II | >100.0 | >100.0 | >100.0 | >100.0 |
| 14. Diplococcus pneumoniae, type III | >100.0 | >100.0 | >100.0 | >100.0 |
| 15. Streptococcus hemolyticus, D | >100.0 | >100.0 | >100.0 | >100.0 |
| 16. Streptococcus hemolyticus, H | >100.0 | >100.0 | >100.0 | >100.0 |
| 17. Corynebacterium diphtheriae, Tront | >100.0 | >100.0 | >100.0 | >100.0 |
| 18. Corynebacterium diphtheriae, HA | >100.0 | >100.0 | >100.0 | >100.0 |
| 19. Mycobacterium tuberculosis, H 37RV | >100.0 | >100.0 | >100.0 | >100.0 |
| 20. Mycobacterium avium | >100.0 | >100.0 | >100.0 | >100.0 |
| 21. Mycobacterium 607 | >100.0 | >100.0 | >100.0 | >100.0 |
| 22. Mycobacterium smegmatis | >100.0 | >100.0 | >100.0 | >100.0 |
| 23. Mycobacterium phlei | >100.0 | >100.0 | >100.0 | >100.0 |
| 24. Piricularia oryzae | 0.1 | 0.1 | 0.1 | 0.1 |
| 25. Helminthosporium sigmoideum | >100.0 | >100.0 | >100.0 | >100.0 |
| 26. Sclerotiana libertiana | >100.0 | >100.0 | >100.0 | >100.0 |
| 27. Ophiobolus graminis | >100.0 | >100.0 | >100.0 | >100.0 |
| 28. Fusarium oxysporium | >100.0 | >100.0 | >100.0 | >100.0 |
| 29. Cochliobolus miyabianus | >100.0 | >100.0 | >100.0 | >100.0 |
| 30. Phytophthora infestans | >100.0 | >100.0 | >100.0 | >100.0 |
| 31. Altanaria kikuchiana | >100.0 | >100.0 | >100.0 | >100.0 |
| 32. Epidermophyton ferrugineum | >100.0 | >100.0 | >100.0 | >100.0 |
| 33. Trichophyton rubrum, Takase | >100.0 | >100.0 | >100.0 | >100.0 |
| 34. Trichophyton interdigitale | >100.0 | >100.0 | >100.0 | >100.0 |
| 35. Trichophyton pedis | >100.0 | >100.0 | >100.0 | >100.0 |
| 36. Trichophyton mentagrophytis | >100.0 | >100.0 | >100.0 | >100.0 |
| 37. Scopulariopsis brevicaulis | >100.0 | >100.0 | >100.0 | >100.0 |
| 38. Pichia fermentans | >100.0 | >100.0 | >100.0 | >100.0 |
| 39. Pichia farinose | >100.0 | >100.0 | >100.0 | >100.0 |
| 40. Rhodotorula minuta | >100.0 | >100.0 | >100.0 | >100.0 |
| 41. Torulopsis gropengieperi | >100.0 | >100.0 | >100.0 | >100.0 |
| 42. Debaryomyces subglobosus | >100.0 | >100.0 | >100.0 | >100.0 |
| 43. Aspergillus niger | >100.0 | >100.0 | >100.0 | >100.0 |
| 44. Candida albicans, M-8 | >100.0 | >100.0 | >100.0 | >100.0 |
| 45. Saccharomyces exiguus | >100.0 | >100.0 | >100.0 | >100.0 |
| 46. Cryptococcus diffluens | >100.0 | >100.0 | >100.0 | >100.0 |

TABLE B

| Test organisms | Minimal inhibitory concentration, (mcg./ml.) | | |
|---|---|---|---|
| | N-329B | Valinomycin (Brockmann) | Valinomycin (Brown) |
| 1. Shigella dysenteriae | >100.0 | >100.0 | >100.0 |
| 2. Shigella paradysenteriae, Ohara | >100.0 | >100.0 | >100.0 |
| 3. Salmonella typhosa | >100.0 | >100.0 | >100.0 |
| 4. Salmonella paratyphi A | >100.0 | >100.0 | >100.0 |
| 5. Escherichia coli | >100.0 | >100.0 | >100.0 |
| 6. Pseudomonas aeruginosa | >100.0 | >100.0 | >100.0 |
| 7. Klebsiella penumoniae | >100.0 | >100.0 | >100.0 |
| 8. Bacillus subtilis | >100.0 | >100.0 | >100.0 |
| 9. Bacillus anthracis | >100.0 | >100.0 | >100.0 |
| 10. Staphylococcus aureus, 209 P | >100.0 | >100.0 | >100.0 |
| 11. Diplococcus penumoniae, type I | 5.0 | 5.0 | 5.0 |
| 12. Diplococcus pneumoniae, V-type I | 5.0 | 5.0 | 5.0 |
| 13. Diplococcus pneumoniae, type II | 5.0 | 5.0 | 5.0 |
| 14. Diplococcus pneumoniae, type III | 5.0 | 5.0 | 5.0 |
| 15. Streptococcus hemolyticus, D | 10.0 | 10.0 | 10.0 |
| 16. Streptococcus hemolyticus, H | 10.0 | 10.0 | 10.0 |
| 17. Corynebacterium diphtheriae, Tront | 1.0 | 1.0 | 1.0 |
| 18. Corynebacterium diphtheriae, HA | 1.0 | 1.0 | 1.0 |
| 19. Mycobacterium tuberculosis, H 37RV | 0.5 | 0.5 | 0.5 |
| 20. Mycobacterium avium | >100.0 | >100.0 | >100.0 |
| 21. Mycobacterium 607 | >100.0 | >100.0 | >100.0 |
| 22. Mycobacterium smegmatis | >100.0 | >100.0 | >100.0 |
| 23. Mycobacterium phlei | >100.0 | >100.0 | >100.0 |
| 24. Piricularia oryzae | 0.2 | 0.2 | 0.2 |
| 25. Helminthosporium sigmoideum | 6.3 | 6.3 | 6.3 |
| 26. Sclerotiana libertiana | >100.0 | >100.0 | >100.0 |
| 27. Ophiobolus graminis | 6.3 | 6.3 | 6.3 |
| 28. Fusarium oxysporium | >100.0 | >100.0 | >100.0 |
| 29. Cochliobolus miyabianus | >100.0 | >100.0 | >100.0 |
| 30. Phytophthora infestans | >100.0 | >100.0 | >100.0 |
| 31. Altanaria kikuchiana | >100.0 | >100.0 | >100.0 |
| 32. Epidermophyton ferrugineum | >100.0 | >100.0 | >100.0 |
| 33. Trichophyton rubrum, Takase | >100.0 | >100.0 | >100.0 |
| 34. Trichophyton interdigitale | >100.0 | >100.0 | >100.0 |
| 35. Trichophyton pedis | >100.0 | >100.0 | >100.0 |
| 36. Trichophyton mentagrophytis | >100.0 | >100.0 | >100.0 |
| 37. Scopulariopsis brevicaulis | >100.0 | >100.0 | >100.0 |
| 38. Pichia fermentans | >100.0 | >100.0 | >100.0 |
| 39. Pichia farinose | >100.0 | >100.0 | >100.0 |
| 40. Rhodotorula minuta | >100.0 | >100.0 | >100.0 |
| 41. Torulopsis gropengieperi | >100.0 | >100.0 | >100.0 |
| 42. Debaryomyces subglobosus | >100.0 | >100.0 | >100.0 |
| 43. Aspergillus niger | >100.0 | >100.0 | >100.0 |
| 44. Candida albicans, M-8 | >100.0 | >100.0 | >100.0 |
| 45. Saccharomyces exiguus | >100.0 | >100.0 | >100.0 |
| 46. Cryptococcus diffluens | >100.0 | >100.0 | >100.0 |

NOTE.—Culture medium, 1–10, beef extract; 11–18, beef extract +10% rabbit blood; 19, Kirchner+10% human plasma; 20–23, beef extract+glycerol; 24–31, potato-glucose; 32–46, Sabouraud+yeast extract.
Method of testing; 1–18 and 20–46, agar-streak dilution method; 19, subsurface culture.
End point observed; 1–18, no growth after 24 hours at 37° C.; 19, no growth after 3 weeks at 37° C.; 20–23, no growth after 48 hours at 37° C.; 24–31, no growth after 10 days at 28° C.; 32–44, no growth after 7 days at 28° C.; 45–46, no growth after 2 days at 28° C.

From the preceding tables, it is seen that the antibiotics N-329A, Nonactin, SQ 15,859 and TA 25M-I are fairly specific in their action. That is, only *Piricularia oryzae* is inhibited strongly, though the other organisms are not affected at all. The minimal inhibitory concentrations of these four antibiotics against the said phytopathogenic fungus are of same order, no quantitative difference being observed. The above tables also show that both the antibiotics N-329B and Valinomycin are fairly specific in their activity. Thus, *Piricularia oryzae* is inhibited strongly, as is also *Mycobacterium tuberculosis*, H37Rv, and also they are effective against a few phytopathogenic fungi such as *Helminthosporium sigmoidenum* and *Ophiobolus graminis* and some gram-positive bacteria such as *Diplococcus pneumoniae*, *Streptococcus hemolyticus* and *Corynebacterium diphtheriae*.

To test for fungicidal activity of the antibiotics N-329A and N-329B, so-called contact test technics were run using spore suspension of *Piricularia oryzae* which was harvested from a 14 day culture grown on potato-glucose agar slants and suspended with 10 ml. sterile water. Because antibiotics are insoluble in water, an aqueous suspension of the antibiotics was prepared and then diluted to desired concentration with sterile distilled water. In contact test with spore suspension of *Piricularia oryzae*, a mixture of 8 millilitres of the antibiotics in concentrations of 1 microgram to 100 micrograms per millilitre and 0.3 millilitre of the spore suspension were allowed to stand at room temperature (about 23° C.) for 4, 8 and 24 hours. Each sample was centrifuged, and the spores were washed twice with sterile saline. The washed spores were then inoculated onto the surface of potato-glucose agar slant and incubated at 28° C. for 14 days. After incubation, the slants were examined for the presence of growth and compared with control cultures grown under identical conditions. The lowest concentration of the antibiotics preventing growth on the slants was considered a fungicidal concentration of the antibiotics. The results of this study are presented in the following table wherein the marks "+" and "−" indicate growth and no growth, respectively:

| Antibiotics | Concentration (mcg./ml.) | Result of subcultures made at intervals (hours) | | |
|---|---|---|---|---|
| | | 4 | 8 | 24 |
| N-329A | 100 | + | + | − |
| | 50 | + | + | − |
| | 10 | + | + | + |
| | 1 | + | + | + |
| N-329B | 100 | − | − | − |
| | 50 | − | − | − |
| | 10 | − | − | − |
| | 1 | + | − | − |
| None (control) | | + | + | + |

As can be seen from the above table, both antibiotics are fungicidal to *Piricularia oryzae*, the antibiotic N-329B showing a stronger fungicidal action on the organism than the antibiotic N-329A.

Because of their fungicidal activity in vitro against *Piricularia oryzae*, so-called pot test in greenhouse with experimental infection of the fungi in shoot leaves of rice-plant seedlings was set up. The seedlings, Aichi-asahi, were planted in pot (4 inches in diameter) and incubated for approximately 50 days in greenhouse. The shoot leaves of the rice-plant seedlings were infected with spore suspension of *Piricularia oryzae*, KU by spraying on the surfaces of the leaves. Only one treatment was effected one day after infection with spray applications of the antibiotics, which were suspended with sodium carboxymethyl cellulose, and 20 millilitres of the antibiotic suspensions were sprayed on each of the spots. The effectiveness of the antibiotics was evaluated by degree (type) of the symptoms of the infected leaves at 10-days after infection. The results are presented in the following table:

| Concentration (mcg./ml.) | Symptoms of infected leaves at 10 days after infection | |
|---|---|---|
| | N-329A | N-329B |
| 100.0 | Spot type (brownish spot: leaf, green). | Spot type (brownish spot: leaf, green). |
| 50.0 | do | Do. |
| 25.0 | Diffusible type (leaf, yellowing). | Diffusible type (leaf, yellowing). |
| 12.5 | do | Do. |
| 0 (control) | do | Do. |

The data in the above table establishes that both antibiotics, N-329A and N-329B, are effective against infection of *Piricularia oryzae* in shoot leaves of rice-plant seedlings, and the protective action of both antibiotics involves a very similar activity.

As shown above, the antibiotics N-329A and N-329B exhibit fungistatic and fungicidal activities against *Piricularia oryzae* and other phytopathogenic fungi such as *Helminthosporium sigmoideum* and *Ophiobolus graminis*. Accordingly, they are useful for therapy and prophylaxis of plant diseases caused by the said phytopathogenic fungi, especially rice blast. Otherwise stated, they are used as active ingredients in germicidal compositions for agricultural use.

According to this invention, germicidal compositions such as dusts, dispersions and emulsions, are contemplated which comprise either or both of the antibiotics N-329A and N-329B in association with one or more solid or liquid diluents of the types commonly used in germicidal compositions. In addition, these germicidal compositions may contain one or more materials known to be active as fertilizers, soil conditioners or plant growth regulators. These germicidal compositions also may contain one or more germicidal agents besides the antibiotics N-329A and N-329B of the present invention. Examples of typical germicidal compositions according to this invention are:

(a) Wettable powders comprising either or both of the antibiotics N-329A and N-329B as the active ingredients dispersed in a concentration up to 50 percent water in an inert absorbent carrier such as a diatomaceous earth together with a wetting and/or dispersing agent such as an alkali metal salt of a long aliphatic sulfate chain, a partly neutralized sulfuric acid derivative of either a petroleum oil or a natural occurring glyceride, and a condensation product of an alkylene oxide with an organic acid.

(b) Self-emulsifying concentrates comprising the active ingredients in solution in the desired concentration in a suitable organic solvent such as dioxane and acetone plus a suitable wetting agent.

(c) Dusts obtained by dispersing the active ingredients in an inert absorbent carrier in combination with one or more inert carriers such as talc, diatomaceous earths, wood flours and clays.

(d) Compositions of the active ingredients formulated in the manner commonly employed in the art for the preparation of fungicidal dusts and aerosols.

The use of the antibiotics which have substantially the same physico-chemical properties as the antibiotics N-329A or N-329B per se, in place of the antibiotics N-329A and/or N-329B in the said germicidal compositions for agricultural use, is within the scope of the present invention.

The following examples illustrate presently-preferred embodiments of this invention.

*Example 1*

An aqueous nutrient medium is prepared from the following materials:

Grams per liter
Corn starch _____ 10.0
Soybean meal _____ 10.0

| | Grams per liter |
|---|---|
| Glycerol | 5.0 |
| Corn steep liquor | 5.0 |
| Calcium carbonate | 3.5 |
| Sodium chloride | 3.0 |

The pH is adjusted to about 7.0. After sterilization with steam at 120° C. for 20 minutes, the medium is inoculated with *Streptomyces tsusimaensis* n. sp. and cultivated with stirring under aeration for a period of 144 to 192 hours at a temperature between 27 and 29° C.

The fermentation broth is combined with diatomaceous earth (Hyflo Super-Cel) (10 grams per litre of the fermentation broth), adjusted with 10% hydrochloric acid to about pH 7.0, stirred for 30 minutes and suction-filtered. The collected cake of the mycelium and the diatomaceous earth is washed with water and shaken three times with, each time, about one-fourth volume of acetone. The acetone extracts are combined, concentrated under reduced pressure and then shaken with petroleum ether. The petroleum ether extract is concentrated to separate a crystalline substance. The crystalline substance is collected by filtration and recrystallized from acetone to give the antibiotic N-329A as crystals melting at 148 to 149.5° C. The filtrate from which the antibiotic N-329A is separated is evaporated to remove the solvent. The resultant oily substance is poured onto a column of alumina pretreated with petroleum ether and the column developed with petroleum ether. Each of the eluted fractions with petroleum ether is subjected to the test for determination of antibiotic activity by the paper-disc or cup method [Edwin et al.: J. Bacteriology, vol. 50, p. 459 (1945); Nishimura et al.: Annual Report of Shionogi Research Laboratory, No. 11, p. 145 (1961)] using *Corynebacterium diphtheriae*. The fractions showing the antibiotic activity are combined, concentrated under reduced pressure and allowed to stand at room temperature to separate a crystalline substance. The crystalline substance is collected by filtration and recrystallized from acetone to give the antibiotic N-329B as crystals melting at 190.5 to 191° C.

From 50 litres of the nutrient medium, there are obtained 2 to 3 grams of the antibiotic N-329A and 0.2 to 0.3 gram of the antibiotic N-329B.

*Example 2*

The following materials are combined and mixed well to make a powdery preparation for agricultural use which is applied to infected plants by scattering:

| | Parts by weight |
|---|---|
| Antibiotic N-329A | 0.9 |
| Antibiotic N-329B | 0.1 |
| Clay | 66.0 |
| Talc | 33.0 |

*Example 3*

The following materials are combined and mixed well to make a dispersion for agricultural use which is diluted with water on use and applied to infected plants by spraying:

| | Parts by weight |
|---|---|
| Antibiotic N-329A | 0.5 |
| Sodium carboxymethyl cellulose | 0.5 |
| Water | 99.0 |

*Example 4*

The following materials are combined and mixed well to make a dispersion for agricultural use which is diluted with water on use and applied to infected plants by spraying:

| | Parts by weight |
|---|---|
| Antibiotic N-329B | 0.1 |
| Hydrous silica | 0.5 |
| Water | 99.4 |

Minor modifications may be made in carrying out the present invention without departing from the spirit and scope thereof.

The herein before-mentioned Rast method is described in full in "Experiments in Organic Chemistry," p. 21 (1955), by Fieser.

What is claimed is:

1. A method of controlling rice blast on a rice plant which comprises applying to the rice plant a fungicidal quantity of an antibiotic having substantially the following properties:

Melting point—148 to 149.5° C.;
Elemental analysis (% by weight)—C, 65.65; H, 8.85; O, 25.48; no nitrogen, sulfur and halogen;
Molecular weight—730 to 740 by the Rast method;
Molecular formula—$C_{40}H_{64}O_{12}$;
Specific rotation—$[\alpha]_D^{22} +0.5 \pm 2°$ (c.=1.269% in chloroform);
Ultraviolet absorption spectrum in 95% ethanol-maxima at 211 to 213 m$\mu$ $(E_{1\ cm.}^{1\%} = 6.4)$ Infrared absorption spectrum in Nujol mull-characteristic bands at 2921, 1726, 1468, 1425, 1383, 1371, 1360, 1333, 1298, 1265, 1190, 1168, 1152, 1135, 1116, 1095, 1061, 1021, 996, 974, 948, 932, 912, 893, 868, 852, 813, 793, 750, 723, 658 cm.$^{-1}$;
Positive Dragendorf's test and iodine reaction;
Negative ninhydrin, biuret, Molisch, indol, anthrone, Tollen's phloroglucin, Sakaguchi and ferric chloride tests;
Acid hydrolysate gives negative ninhydrin test.

2. A method of controlling rice blast on a rice plant which comprises applying to the rice plant a fungicidal quantity of an antibiotic having substantially the following properties:

Melting point—190.5 to 191° C;
Elemental analysis (% by weight)—C, 58.48; H, 8.22; O, 24.77; N, 7.66; no sulfur and halogen;
Molecular weight—764 by Rast method;
Molecular formula—$C_{36}H_{60}H_{12}N_4$;
Specific rotation—$[\alpha]_D^{23} +36.2 \pm 2°$ (c.=1.015% in chloroform) and $[\alpha]_D^{25} +32.2 \pm 1.3°$ (c.=1.539% in benzene);
Ultraviolet absorption spectrum in n-hexane—no maxima;
Infrared absorption spectrum in KBr—characteristic bands at 3300, 2954, 1743, 1652, 1538, 1470, 1375, 1345, 1313, 1302, 1252, 1191, 1147, 1131, 1098, 1027, 1009, 978, 931, 886, 865, 795, 764, 749 cm.$^{-1}$;
Positive Dragendorf's test and iodine reaction;
Negative Molisch, indol, anthrone, Tollen's phloroglucin, Sakaguchi and ferric chloride reactions;
Acid hydrolysate gives positive ninhydrin test, and contains valine, $\alpha$-hydroxyisovaleric acid and lactic acid.

3. A process of controlling rice blast on a rice plant which comprises applying to the rice plant a fungicidal composition having as an active ingredient an antibiotic having substantially the following properties:

Melting point—148 to 149.5° C.
Elemental analysis (% by weight)—C, 65.65; H, 8.85; O, 25.48; no nitrogen, sulfur and halogen;
Molecular weight—730 to 740 by the Rast method;
Molecular formula—$C_{40}H_{64}O_{12}$;
Specific rotation—$[\alpha]_D^{22} +0.5 \pm 2°$ (c=1.269% in chloroform);
Ultraviolet absorption spectrum in 95% ethanol—maxima at 211 to 213 m$\mu$ $(E_{1\ cm.}^{1\%} = 6.4)$ Infrared absorption spectrum in Nujol mull—characteristic bands at 2921, 1726, 1468, 1425, 1383, 1371, 1360, 1333, 1298, 1265, 1190, 1168, 1152, 1135, 1116, 1095, 1061, 1021, 996, 974, 948, 932, 912, 893, 868, 852, 813, 793 750, 723, 658 cm.$^{-1}$;
Positive Dragendorf's test and iodine reaction;
Negative ninhydrin, biuret, Molisch, indol, anthrone, Tollen's phloroglucin, Sakaguchi and ferric chloride tests;

Acid hydrolysate gives negative ninhydrin test, and containing a major amount of fungicide carrier.

4. A process of controlling rice blast on a rice plant which comprises applying to the rice plant a fungicidal composition having as an active ingredient an antibiotic having substantially the following properties:

Melting point—190.5 to 191° C.;
Elemental analysis (% by weight)—C, 58.48; H, 8.22; O, 24.77; N, 7.66; no sulfur and halogen;
Molecular weight—764 by the Rast method;
Molecular formula—$C_{36}H_{60}H_{12}N_4$;
Specific rotation—$[\alpha]_D^{23}+36.2\pm2°$ (c.=1.015% in chloroform) and $[\alpha]_D^{25}+32.2\pm1.3°$ (c.=1.539% in benzene);
Ultraviolet absorption spectrum in n-hexane—no maxima;
Infrared absorption spectrum in KBr—characteristic bands at 3300, 2954, 1743, 1652, 1538, 1470, 1375, 1345, 1313, 1302, 1252, 1191, 1147, 1131, 1098, 1027, 1009, 978, 931, 886, 865, 795, 764, 749 cm.$^{-1}$;
Positive Dragendorf's test and iodine reaction;
Negative biuret, Molisch, indol, anthrone, Tollen's phloroglucin, Sakaguchi and ferric chloride reactants;
Acid hydrolysate gives positive ninhydrin test, and contains valine, α-hydroxyisovaleric acid and lactic acid, and containing a major amount of fungicide carrier.

5. A process for producing an antibiotic having substantially the following properties:

Melting point—148 to 149.5° C.;
Elemental analysis (% by weight)—C, 65.65; H, 8.85; O, 25.48; no nitrogen, sulfur and halogen;
Molecular weight—730 to 740 by the Rast method;
Molecular formula—$C_{40}H_{64}O_{12}$;
Specific rotation—$[\alpha]_D^{22}+0.5\pm2°$ (c.=1.269% in chloroform);
Ultraviolet absorption spectrum in 95% ethanol—maxima at 211 to 213 m$\mu$ $$(E_{1\,cm.}^{1\%}=6.4)$$

Infrared absorption spectrum in Nujol mull—characteristic bands at 2921, 1726, 1468, 1425, 1383, 1371, 1360, 1333, 1298, 1265, 1190, 1168, 1152, 1135, 1116, 1095, 1061, 1021, 996, 974, 948, 932, 912, 893, 868, 852, 813, 793, 750, 732, 658 cm.$^{-1}$;
Positive Dragendorf's test and iodine reactions;
Negative ninhydrin, biuret, Molisch, indol, anthrone, Tollen's phloroglucin, Sakaguchi and ferric chloride tests.

Acid hydrolysate gives negative ninhydrin test; which comprises cultivating Streptomyces tsusimaensis (ATCC No. 15,141) in an aqueous nutrient medium under submerged aerobic conditions at a temperature of from about 25 to about 32° C. whereby antibitoic accumulates in the fermentation broth, and recovering the above-defined accumulated antibiotic from the fermentation broth.

6. A process for producing an antibiotic having substantially the following properties:

Melting point—190.5 to 191° C.;
Elemental analysis (% by weight)—C, 58.48; H, 8.22; O, 24.77; N, 7.66; no sulfur and halogen;
Molecular weight—764 by the Rast method;
Molecular formula—$C_{36}H_{60}H_{12}N_4$;
Specific rotation—$[\alpha]_D^{23}+36.2\pm2°$ (c.=1.015% in chloroform) and $[\alpha]_D^{25}+32.2\pm1.3°$ (c.=1.539% in benzene);
Ultraviolet absorption spectrum in n-hexane — no maxima;
Infrared absorption spectrum in KBr—characteristic bands at 3300, 2954, 1743, 1652, 1538, 1470, 1375, 1345, 1313, 1302, 1252, 1191, 1147, 1131, 1098, 1027, 1009, 978, 931, 886, 865, 795, 764, 749 cm.$^{-1}$;
Positive Dragendorf's test and iodine reaction;
Negative biuret, Molisch, indol, anthrone, Tollen's phloroglucin, Sakaguchi and ferric chloride reactions;
Acid hydrolysate gives positive ninhydrin test, and contains valine, α-hydroxyisovaleric acid and lactic acid; which comprises cultivating Streptomyces tsusimaensis (ATCC No. 15141) in an aqueous nutrient medium under submerged aerobic conditions at a temperature of from about 25 to about 32° C. whereby antibiotic accumulates in the fermentation broth, and recovering the above-defined accumulated antibiotic from the fermentation broth.

7. An antibiotic-producing process which comprises cultivating Streptomyces tsusimaensis (ATCC No. 15141) in an aqueous nutrient medium under submerged aerobic conditions at a temperature of from about 25 to about 32° C. and recovering the accumulated two antibiotics, one of said antibiotics having the following properties:
Melting point—148 to 149.5° C.;
Elemental analysis (% by weight)—C, 65.65; H, 8.85; O, 25.48; no nitrogen, sulfur and halogen;
Molecular weight—730 to 740 by the Rast method;
Molecular formula—$C_{40}H_{64}O_{12}$;
Specific rotation—$[\alpha]_D^{22}+0.5\pm2°$ (c.=1.269% in chloroform);
Ultraviolet absorption spectrum in 95% ethanol—maxima at 211 to 213 m$\mu$ $$(E_{1\,cm.}^{1\%}=6.4)$$

Infrared absorption spectrum in Nujol mull—characteristic bands at 2921, 1726, 1468, 1425, 1383, 1371, 1360, 1333, 1298, 1265, 1190, 1168, 1152, 1135, 1116, 1095, 1061, 1021, 996, 974, 948, 932, 912, 893, 869, 852, 813, 793, 750, 723, 658 cm.$^{-1}$;
Positive Dragendorf's test and iodine reaction;
Negative ninhydrin, biuret, Molisch, indol, anthrone, Tollen's phloroglucin, Sakaguchi and ferric chloride tests;
Acid hydrolysate gives negative ninhydrin test; and the other of said antibiotic having the following properties:
Melting point—190.5 to 191° C.;
Elemental analysis (% by weight)—C, 58.48; H, 8.22; O, 24.77; N, 7.66; no sulfur and halogen;
Molecular weight—764 by the Rast method;
Molecular formula—$C_{36}H_{60}H_{12}N_4$;
Specific rotation—$[\alpha]_D^{23}+36.2\pm2°$ (c.=1.015% in chloroform) and $[\alpha]_D^{25}+32.2\pm1.3°$ (c.=1.539% in benzene);
Ultraviolet absorption spectrum in n-hexane — no maxima;
Infrared absorption spectrum in KBr—characteristic bands at 3300, 2954, 1743, 1652, 1538, 1470, 1375, 1345, 1313, 1302, 1252, 1191, 1147, 1131, 1098, 1027, 1009, 978, 931, 886, 865, 795, 764, 749 cm.$^{-1}$;
Positive Dragendorf's test and iodine reaction;
Negative biuret, Molisch, indol, anthrone, Tollen's phloroglucin, Sakaguchi and ferric chloride reactions;
Acid hydrolysate gives positive ninhydrin test, and contains valine, α-hydroxyisovaleric acid and lactic acid.

References Cited

Corpaz et al.: Helv. Chim. Acta, vol. 38, pp. 1445–8 (1955).

Dutcher: Antimicrobial Agents and Chemotherapy, pp. 173–7 (1961).

Brockmann et al.: Chem. Ber., vol. 88, pp. 57–61 (1955).

Brown et al.: Antibiotics and Chemotherapy, vol. 12, pp. 482–7 (1962).

ALBERT T. MEYERS, *Primary Examiner.*

D. M. STEPHENS, *Assistant Examiner.*